United States Patent [19]
Ikeda

[11] 3,936,724
[45] Feb. 3, 1976

[54] AUTOMATIC VOLTAGE REGULATOR FOR A SEPARATELY EXCITED GENERATOR

[75] Inventor: Yoshihiko Ikeda, Susono, Japan

[73] Assignee: Kokusan Denki Co., Ltd., Shizuoka, Japan

[22] Filed: Feb. 13, 1975

[21] Appl. No.: 549,705

[30] Foreign Application Priority Data
Feb. 19, 1974 Japan............................ 49-20057[U]

[52] U.S. Cl. ...................... 322/28; 322/25; 322/46; 322/68
[51] Int. Cl.² ........................................... H02P 9/26
[58] Field of Search .................. 322/25, 28, 46, 68; 320/61, 64

[56] References Cited
UNITED STATES PATENTS

| | | | |
|---|---|---|---|
| 2,733,233 | 12/1956 | Marcks | 322/25 |
| 3,161,817 | 12/1964 | Carlson | 322/28 |
| 3,369,171 | 2/1968 | Lane | 322/68 |

Primary Examiner—R. N. Envall, Jr.
Assistant Examiner—Robert J. Hickey
Attorney, Agent, or Firm—Woodling, Krost, Granger & Rust

[57] ABSTRACT

This invention is directed to an automatic voltage regulator for a seperately excited generator comprising a main AC generator including an armature winding and an exciting winding and an exciter of an AC magneto generator associated with the exciting winding of the main AC generator. The regulator comprises a single controlled semiconductor switching device disposed in parallel to the exciting winding of the main AC generator and an output voltage detecting and control signal generating circuit which is adapted to detect the output voltage of the main AC generator and to apply a control signal to the controlled electrode of the controlled semiconductor switching device when the output voltage of the main AC generator reaches more than a predetermined value. The exciter of the AC magneto generator has an operating frequency higher than that of the main AC generator whereby the output voltage of the main generator can be regulated in a minute manner.

5 Claims, 5 Drawing Figures

AUTOMATIC VOLTAGE REGULATOR FOR A SEPARATELY EXCITED GENERATOR

BACKGROUND OF THE INVENTION

An automatic voltage regulator for a separately excited generator is well known which is adapted to control an exciting current in response to the output voltage of the generator. It has been disclosed in British Pat. No. 966,024 issued on Aug. 6, 1964, for example. One of the disadvantages of such a prior art is that an exciting voltage from an output of an exciter irregularily varies due to separate characteristics of two controlled rectifying means incorporated between the exciter and the exciting winding of the generator with the result that the output voltage of the generator tends to be distorted. Such distorted output voltage of the generator is shown at dotted line in FIG. 3C wherein the output voltage is shown to be conveniently rectified. Variation indicated by $\Delta E$ in FIG. 3C causes a lighting device to flicker if it is operatively associated with the output of the generator. Another disadvantage of the prior art is that the regulator cannot regulate the output voltage of the generator in a minute manner because the operating frequency of the exciter is generally very small so that it approximately equals the operating frequency of the generator.

SUMMARY OF THE INVENTION

Accordingly, it is a principal object of the present invention to provide an automatic voltage regulator for a separately excited generator adapted to regulate the output voltage of the generator without any distortion.

It is another object of the present invention to provide an automatic voltage regulator for a separately excited generator adapted to regulate the output voltage of the generator in a minute manner.

One of the most important features of the present invention is that an exciting output voltage of an exciter which comprises an AC magneto generator has the frequency much higher than that of the output voltage of a main AC generator whereby an output voltage of the main AC generator can be regulated in a minute manner. Another important feature of the present invention is that the exciting voltage from the exciter is controlled by a single controlled semiconductor device whereby the output voltage can be regulated without any distortion.

BRIEF DESCRIPTION OF THE DRAWINGS

The above and other objects and features of the present invention will be apparent from the description of the preferred embodiment of the present invention taken with reference to the accompanying drawings in which.

DETAILED DESCRIPTION OF THE PREFERRED EMBODIMENT

Figure 1:
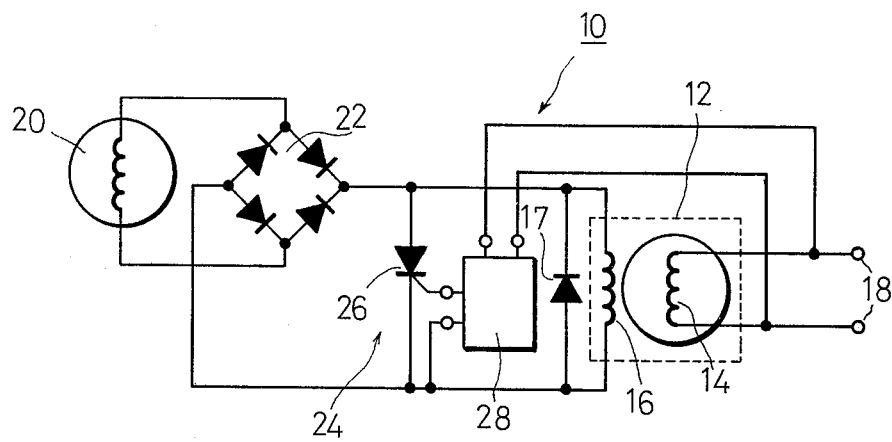
FIG. 1 is a schematic diagram of a circuit of an automatic voltage regulator for a separately excited generator in accordance with the present invention.
Figure 3A:
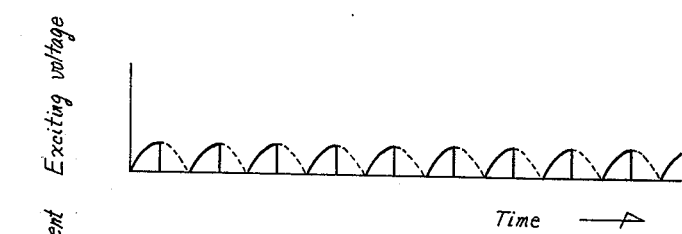
FIGS. 3A to 3C show waveforms of the rectified exciting voltage, the exciting current and the output voltage of the main AC generator, respectively with the output voltage of the main AC generator shown to be conveniently rectified.

Referring now to FIG. 1, there is shown a separately excited generator arrangement indicated generally at numeral 10, which comprises a main AC generator 12 having an armature or output winding 14 and an exciting winding 16, the former of which is connected to output means 18. A diode 17 may be connected in parallel to the exciting winding 16. The arrangement 10 further comprises an exciter 20 which is in the form of an AC magneto generator. It should be noted that the exciter 20 is constructed so that the output voltage of the exciter has the frequency much higher than that of the output voltage of the main AC generator 12. By way of example, the exciter may have eight poles while the main AC generator may have two poles. Thus, it will be understood that in that case the exciting voltage has the frequency four times that of the output voltage of the main AC generator. The exciter has the output connected to an input of a full wave rectifier 22, the output of which is connected to the exciting winding 16 of the main AC generator 12. Thus, it will be understood that the rectified output voltage shown in FIG. 3A energizes the exciting winding 16 so that it excites the armature or output winding 14 to produce an output voltage shown in FIG. 3C wherein it is shown to be conveniently rectified. Although the exciter 20 and the main generator 12 may be in the form of a single phase generator, it will be understood that they may be in the form of a polyphase generator.

An automatic voltage regulator for a separately excited generator is generally indicated at numeral 24 in FIG. 1 and comprises a single controlled semiconductor switching device such as a thyristor 26 connected in parallel to the exciting winding 16 of the main AC generator 12 to bypass the exciting current (FIG. 3B) from flowing through the exciting winding 16 when the thyristor 26 is in the conductive state. The regulator 24 further comprises an output voltage detecting and control signal generating circuit 28 having the input connected to the output means of the main AC generator 12 and having the output connected to the gate and cathode of the thyristor 26.

Figure 2:
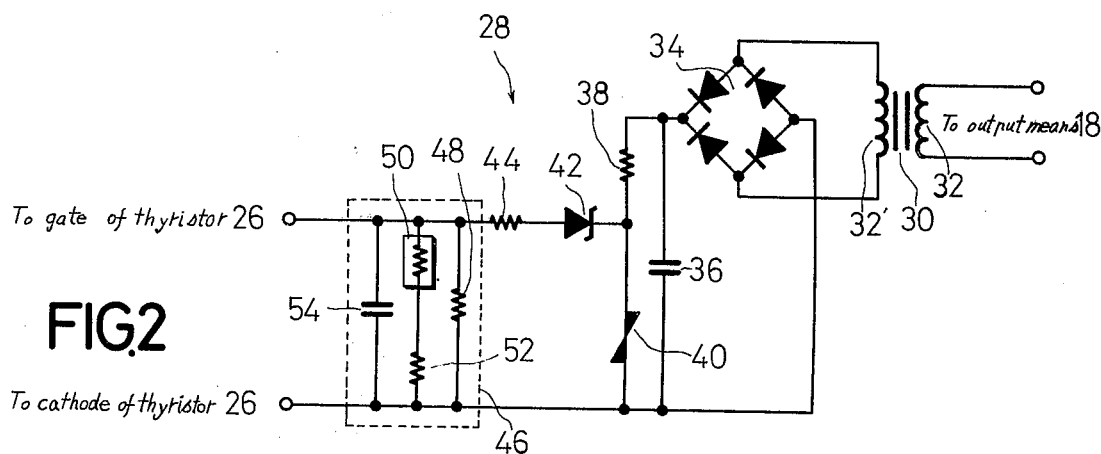
FIG. 2 is a schematic diagram of an output voltage detecting and control signal generating circuit employed in the automatic voltage regulator of FIG. 1.

The output voltage detecting and control signal generating circuit 28 is shown in detail in FIG. 2. The circuit 28 may comprise an insulating transformer 30 including a primary winding 32 connected to the output means 18 of the main AC generator 12 and a secondary winding 32' connected to a full wave rectifier 34 at the input thereof. The output of the full wave rectifier 34 may be connected to a smoothing capacitor 36 and a dividing series connection of a resistor 38 and a varister 40 which is connected in parallel to the capacitor 36. The varister 40 serves to prevent the operating point of the circuit 28 from being adversely affected by a load current flowing from the main AC generator 12 through a load connected to the output means 18. The function of the varister 40 has been disclosed in pending U.S. patent application Ser. No. 485,984 assigned to the same assignee. One of the ends of the varister 40 is connected through a reversed Zener diode 42 and through a resistor 44 to the gate of the thyristor 26 and the other end of the varister 40 is connected to the cathode of the thyristor 26. The Zener diode 42 has a Zener voltage set so that it becomes conductive when the output voltage of the main AC generator 12 is over a predetermined value. Thus, when the Zener diode 42 is in the conductive state, the thyristor 26 has a gate current flowing through the gate and cathode thereof to be turned on so that it bypasses the exciting current from flowing through the exciting winding 16 of the main AC generator 12. A temperature compensating circuit 46 may be provided between the gate and cathode of the thyristor 26, and it may comprise a resistor 48 and a series connection of a thermistor 50 and a resistor 52 which is connected in parallel to the resistor 48. A capacitor 54 may be connected in parallel to the temperature compensating circuit 46 and serves to prevent an impulsive noise from adversely affecting the operation of the thyristor 26.

Figure 3B:
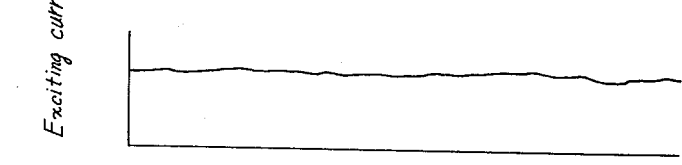
Figure 3C:
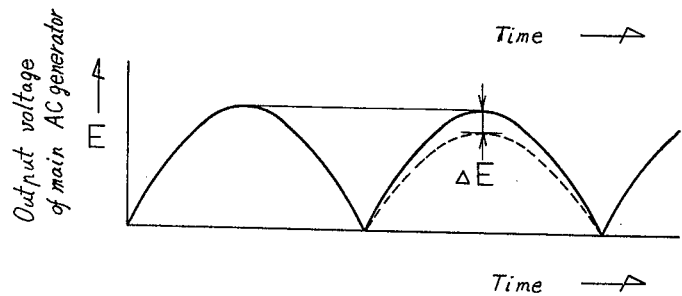

With the automatic voltage regulator of the present invention, AC output of the exciter 20 is rectified by the full wave rectifier 22 and supplied to the exciting winding 16 of the main AC generator 12 as previously described. As a result, the main AC generator 12 produces AC output voltage as shown in FIG. 3C. When the output voltage reaches more than the predetermined value, the output voltage detecting and control signal generating circuit 28 applies a control signal to the gate of the thyristor 26 and as a result it becomes conductive. Thus, the exciting current (FIG. 3B) to be supplied to the exciting winding 16 is substantially short-circuited through the thyristor 26, and therefore, the main AC generator fails to be excited by the exciting winding 16. At that time, the output voltage of the main generator 12 is caused to be lowered and then the output voltage detecting and control signal generating circuit 28 stops supplying the control signal to the gate of the thyristor 26 so that it becomes nonconductive. Thus, the main generator 12 is again excited to raise the output voltage. It will be understood that by repeating such operation of the regulator the output voltage of the main AC generator is kept constant. It should be noted that since the frequency of the exciting output from the exciter 20 is much higher than that of the output voltage of the main AC generator 12 the latter can be minutely regulated. Furthermore, the single thyristor 26 causes the exciting current to be flattened without any distortion as shown in FIG. 3B and therefore, the output voltage is never distorted. This fact causes a lighting load to be energized without flicker. It will be understood that the diode 17 serves to protect from being applied to the thyristor 26, a reversely induced voltage established across the exciting winding 16 when the thyristor 26 becomes conductive.

Although a single preferred embodiment of the present invention has been illustrated and described with reference to the accompanying drawings, it will be apparent to those skilled in the art that various changes and modifications may be made without departing from the spirit and scope of the present invention, which is intended to be defined only to the appended claim.

What is claimed is:

1. An automatic voltage regulator for a separately excited generator comprising a main AC generator including an armature winding and an exciting winding and an exciter of an AC magento generator associated with said exciting winding of said main AC generator, said regulator comprising a single controlled semiconductor switching device disposed in parallel to said exciting winding of said main AC generator; an output voltage detecting and control signal generating circuit having the input connected to the output of said armature winding to detect the output voltage of said main AC generator and having the output connected to a controlled electrode of said controlled semiconductor switching device to apply a control signal to said controlled electrode when the output voltage of said main AC generator reaches more than a predetermined value; and the exciting output voltage from said AC magneto generator having frequency much higher than that of the output voltage of said main AC generator.

2. An automatic voltage regulator as set forth in claim 1, wherein said output voltage detecting and control signal generating circuit comprises an insulating transformer having the input connected to the output of said armature winding of said main AC generator, rectifier means connected to the output of said insulating transformer, and a semiconductor switching device connected to said rectifier means at the DC terminal thereof to be conducted when the output voltage of said main AC generator reaches more than the predetermined value, said semiconductor switching device connected to the controlled electrode of said controlled semiconductor switching device.

3. An automatic voltage regulator as set forth in claim 2, wherein said semiconductor switching device of said output voltage detecting and control signal generating circuit is a Zener diode.

4. An automatic voltage regulator as set forth in claim 1, wherein the frequency of the exciting output voltage from said AC magneto generator is four times as high as that of the output voltage of said main AC generator.

5. An automatic voltage regulator as set forth in claim 2, wherein said output voltage detecting and control signal generating circuit further comprises a voltage divider including at least two resistance connected in series to each other, said voltage divider disposed on the output side of said rectifier means, one of said two resistance comprising a nonlinear resistance to which said semiconductor switching device is connected.

* * * * *